Patented Jan. 15, 1935

1,988,015

UNITED STATES PATENT OFFICE 1,988,015

PROCESS OF TREATING ORES

Ralph F. Meyer, Freeport, Pa., assignor to Meyer Mineral Separation Company, Pittsburgh, Pa., a corporation of Delaware No Drawing. Application November 11, 1933, Serial No. 697,697

19 Claims. (Cl. 75—18)

This invention relates to the treatment of oxidized ores to recover their metal value content.

It is among the objects of this invention to provide a simple treatment for the recovery of metal values from oxidized ores, free, or substantially free, from sulfur, particularly those of refractory character containing nickel, cobalt, iron, copper, and the like, which may be practiced readily and cheaply, provides for simple and inexpensive recovery of the metal value content, is highly efficient, and which in a special embodiment is applicable to the recovery of metal values from sulfide ores.

The invention is applicable especially to refractory ores of oxidized character of which typical examples are the magnesium silicates containing nickel and cobalt which occur in New Caledonia, certain copper silicate ores, oxidized Cuban iron ores, certain precious metal ores, and others.

The method provided by the invention is predicated on my discovery that the metal values in oxidized ores free from sulfur may be converted easily and cheaply to forms readily amenable to further treatment by subjecting the ore to partial reduction at an elevated temperature and in admixture with a solid sulfur material. After the treatment the ore is cooled in an inert atmosphere to a relatively low temperature, for instance, 150° C. or below, before exposing it to the oxidizing influence of the atmosphere. It is advantageous to moisten or wet the ore with water or a reagent solution before or at the time of exposing it to the air. By so doing pyrophoric compounds which may be present are prevented from generating excessive amounts of heat, which might destroy or adversely affect the amenable character of the reduced ore.

This treatment breaks down the refractory complexes and converts the metal values largely or entirely to forms readily amenable to recovery, apparently to sulfides in which the sufur appears to be loosely bound and which may be easily separated from the ore, either by direct leaching with a suitable solvent, such as a solution of copper chloride, iron chloride, or other suitable chloride. For some purposes a more desirable procedure is to render the reduced ore quasi-wet with a liquid reagent, age it in such a condition for a short time, and then leach, as will be described more fully hereinafter. Or, if desired, the sulfides may be separated from the gangue by flotation to provide a concentrate for further treatment according to any particular procedure.

In Patent No. 1,898,018, issued February 21, 1933, on an application filed by me, I have disclosed and claimed a method of treating oxidized ores in which the ore is heated in a reducing atmosphere containing gaseous sulfur dioxide. That treatment is predicated upon reduction of a compound of a polyvalent metal, termed a reagent metal, to a lower valent form which is highly active to acidic gases and stable toward moisture. Iron is the preferred example of reagent metal. After the treatment with a reducing agent and sulfur dioxide the treated ore is moistened to a special degree of moistness termed quasi-wet, and it is then contacted with chlorine, which reacts with the lower valent reagent metal compound, causing chloridizing of the metal values.

In that patented process the exact role of sulfur dioxide is not clearly understood, but as stated in the patent it appears that the beneficial results are not dependent upon extensive combination of the sulfur dioxide with constituents of the ore, and such combination is not essential to successful practice of that process. Thus, the patent states, and this is a fact, that mere traces of sulfur dioxide suffice for the purposes of that invention, and in the preferred embodiment of it less than 1 per cent of sulfur dioxide is used in the reducing atmosphere, from which it appears that the results are not directly due to permanent and extensive combination of sulfur dioxide with metal values.

In contradistinction to that patented process, solid sulfur material is made use of in the present invention and I now believe that in the present process combination takes place between the sulfur of the solid sulfur material and the metal values, as will be explained in more detail hereafter. To repeat, in my prior process a gaseous agent is used and extensive combination of values therewith apparently plays no critical part in obtaining the results. The gaseous reagent may act as a catalytic agent to form active ferrous oxides, which are later made use of as efficient absorbents for acidic gases although the true action is not now known. In the present process, however, solid sulfur agencies are used and their combination with metal values appears to be essential. A further material distinction resides in the fact that for this invention gaseous sulfur dioxide appears to be unnecessary. In fact, in the practice of this invention $SO_2$ may be given off for a few minutes when the reducing element is first added, but its evolution ceases quickly. If the reduction is stopped when the $SO_2$ ceases to appear, and the ore is then cooled in an inert atmosphere, the results of the present invention are not obtained, showing that the solid sulfur material exerts an action different from that of gaseous sulfur dioxide alone. If, however, the reduction is continued, e. g., for three or four hours, no more $SO_2$ appears, but after cooling the metals are in a form amenable to recovery, i. e., free from the original refractory complexes.

A major advantage of the present invention over that disclosed and claimed in my aforesaid patent resides in the fact that as a result of the instant process a major proportion of the metal value content of the ore is converted directly to forms which are amenable to direct removal, without further treatment, e. g., by leaching with liquid solvents. This renders unnecessary the treatment with reagent gas and subsequent leaching which is applied in the process of my aforesaid patent. Or, if desired, concentrates of the metal value sulfides may be produced readily and cheaply by flotation methods. Such direct separations, without the necessity for treatment subsequent to reduction in the presence of solid sulfur material, is rendered possible, as I now believe, through decomposition of the refractory complexes with liberation of metal values for combination with sulfur and formation of sulfides which are easily soluble and responsive to flotation methods. Furthermore, substantial amounts of sulfur compounds are formed in the ore, and these may be utilized with salt in a thermal chloridizing step to form hydrochloric acid and chlorine.

The essence of the invention resides in subjecting the oxidized, i. e., sulfur-free, ore to partial reduction in admixture with solid sulfur material. To this end it may be heated to an elevated temperature, e. g., 350° to 750° or 800° C., with a reducing agent, e. g., a combustible reducing agent such as coal or hydrocarbon oil, in contact with the solid sulfur material. If desired it may be preliminarily heated in an oxidizing, neutral or reducing atmosphere prior to the reduction, and in such case the solid sulfur material may or may not be present, as long as it is present in the reduction step. The reduction is, of course, effected in a reducing atmosphere.

The solid sulfur material contemplated by the invention may assume a variety of forms. Elemental sulfur may be used, but compounds thereof adapted to provide the sulfur needed for effecting the reactions involved are equally applicable, e. g., in the form of metallic sulfates or sulfides. The solid sulfur compound may be provided in a variety of ways, the important consideration being that it be present during reduction. Thus, elemental sulfur, a sulfate, a sulfide, or other solid sulfur compound may be added before or during reduction. Or, a sulfide may be added, the mixture roasted and then reduced. Likewise, the ore may be roasted in the presence of sulfur gases, which effectively provides solid sulfur compounds, such as sulfates, in the ore for subsequent reduction.

An especially valuable aspect of the invention resides in the use of sulfide, such as iron pyrites or other pyritic ore. In such case the desirable metal values, e. g., copper, cobalt or nickel, in both the oxidized (non-sulfide) and in the sulfide ore (solid sulfur material) are converted to the readily amenable forms which characterize this invention. Thus the invention may be applied to render recoverable valuable constituents of oxidized ore and at the same time to turn the solid sulfur material to further use by using solid sulfur material containing metal values which are simultaneously converted to recoverable form.

In the practice of the preferred embodiment of the invention the oxide or oxidized ore is heated to a suitable temperature, e. g., 600° to 750° C., and thereafter is mixed with coal, or other suitable combustible material, and elemental sulfur or a suitable sulfide, such as any of those mentioned, with agitation in a muffle furnace, or in a rotary furnace. In some instances, as in the case of some nickel sulfide ores, it is advantageous to effect reduction at 700° to 800° C. Due to the small amount of reducing agent and to the sulfur present, practically no more metallic iron is produced than at 600° C., but the complexes are broken down more easily and more quickly.

Although the mixture may be heated during the entire reduction period, it has been found unnecessary to agitate and heat it after the mass has been brought up to the desired temperature. Thus, the ore may be brought up to 600° to 750° C., mixed with a suitable amount of coal and solid sulfur material, and dropped into an insulated soaking pit, or an insulated shaft, and allowed to remain undisturbed until reduction is complete. A small amount of reducing gas may be forced, preferably upwardly, through the stationary ore. The heat retained within the mass will be sufficient to keep the ore at an appropriate reducing temperature until reduction has been completed. In using coal in this embodiment of the invention somewhat better results are obtained by having it in rather coarse particles, as these give off their volatile gases more slowly than where finely divided coal is used. The soaking operation has another advantage. During the active reduction period some elemental iron and lower valent iron compounds are formed. This elemental iron and these lower valent compounds are in a particularly active form and during the soaking period they have sufficient time to act upon and convert the refractory metal complexes to less refractory compounds. At the end of the reduction, which usually will be complete in three or four hours, the material is cooled in a reducing or inert atmosphere, whereupon it may be treated for separation of its metallic values.

While I do not limit myself to this theory, it appears probable that elemental iron and activated ferrous oxide, produced by reduction, act upon refractory complexes to remove and combine with a part of the residual sulfur held by such complexes, thus breaking down the complex and destroying its refractory character. Likewise, metallic iron may react with refractory oxides and silicates to form less refractory compounds, by combining with a part of their oxygen content and thus breaking up the complex. Also, the very finely divided carbon which is formed by breaking down coal or crude oil, or even natural gas and the like, assists materially in the reduction during the soaking operation. Usually there is about 2 to 3 per cent of such finely divided carbon present in the reduced ore.

In this aspect of the invention the reducing agent converts the iron oxide content of the ore to a lower valent magnetic form, such as ferrosoferric oxide, or perhaps ferrous oxide, which is highly active toward the metal complex. While not limiting myself thereby, I now believe the actions involved to be substantially as follows: Where elemental sulfur is used the reduced iron oxide reacts directly with it to form iron sulfide which then gives up sulfur to the nickel and related metal values which, like iron, have been reduced to the lower valent reactive form. Nickel and copper have a greater affinity for sulfur than does iron.

Sulfur may be used also to effect both reducing and solubilizing actions, in which case the same reactions appear to occur. However, it should be supplemented with a combustible reducing agent.

It appears probable that when a sulfide, such as pyrites or other sulfide ore, is used as the solid sulfur material it splits off an atom of sulfur, with formation of a lower sulfide, and the nascent sulfur split off reacts either with the lower valent iron oxide to form sulfide, which then reacts with the metal values to form their sulfides, or else the nascent sulfur acts directly upon the reduced compounds of nickel and other polyvalent metal value compounds. When ore is treated with a reducing agent and solid sulfur material, sulfur dioxide appears to play no crucial part in the reactions, because in some instances no odor of this gas can be detected in the atmosphere of the ore undergoing treatment.

A beneficial result of the reducing treatment in conjunction with a solid sulfur material, in addition to breaking down refractory complexes, such as nickel silicates, copper silicates, and the like, is that it avoids the pyrophoric state of compounds of metals such as nickel, copper, etc., which is commonly encountered in reduction treatment of such materials.

The sulfides formed in the practice of the invention are readily amenable to direct leaching, after cooling, by means of liquid solvents, such as dilute acid or chloride solutions, such solvents being well known to those skilled in the art.

In this manner the recoveries may be increased substantially as compared with usual practice. Thus, when Cuban iron ores are reduced with coal and leached with liquid reagents of the types referred to the recovery of metal values is in general only about 25 to 40 per cent. The recovery may be increased to about 60 per cent by using a more powerful reducing agent, such as hydrogen. When, however, such ore is treated in accordance with the practice of this invention, using a solid sulfur material, a further substantial proportion, of the order of 25 per cent, of metal value may be recovered, as by direct leaching.

In the case of precious metal ores the recovery is apparently due to decomposition of complexes and conversion of the base metals, with which the precious metals are tied up, into sulfide forms, thus freeing the precious metals for subsequent recovery by known methods.

Although the reduced material may be leached directly it is preferred for most purposes to render it quasi-wet with a liquid reagent, such as iron chloride solution, age the quasi-wet ore for a time, and then leach. This may be done by mixing the ore with sufficient iron chloride solution to make it quasi-wet, or by making it quasi-wet with water and treating with chlorine or an equivalent gas. In each instance, then, the ore is aged quasi-wet with liquid reagent. The advantage of this procedure is that the resultant leaching solutions are purer than where such a procedure is not followed, because in aging the excess soluble iron is converted almost wholly to an insoluble form, perhaps an oxy-chloride, and this is so whether the ore is aged in the presence or absence of air. On the other hand, when leached directly after reduction, e. g., as described hereinabove, there is enough soluble iron to seriously contaminate the solutions and interfere with their satisfactory or economical treatment. The use of liquid reagent is, in effect, treating with a leaching solution, since both effect extraction of the values as chlorides.

The term quasi-wet as used herein has reference to a particular type of moistening which I have found to be unusually efficacious. As the term is used it means that free liquid is absent from the interstices of the ore, and that the individual particles are wetted with a moisture film that is very minute. There is no flow of liquid through the ore. Such ore is scarcely moist to the touch. It is of loose, open structure, requiring considerable hand pressure to compact it, and then crumbling readily again. A portion of ore in this condition occupies more volume than before being thus wetted. There is a maximum moisture content, varying with different ores, above which the ore volume diminishes rapidly and the particles agglomerate as the voids between them begin to be occupied materially with liquid. This volume change affords a ready practical test of the quasi-wet condition.

The invention may be illustrated further by reference to the following examples. A New Caledonian magnesium silicate ore containing no sulfur, about 2 per cent of cobalt, and about 4 per cent of nickel was reduced with 5 per cent of coal and cooled in an inert atmosphere. It was then rendered quasi-wet and chloridized in accordance with the method disclosed and claimed in my Patent No. 1,822,995, which rendered about 50 to 60 per cent of the nickel and cobalt soluble in water. However, when another sample of the same ore was treated in an identical manner but using 7 per cent of iron pyrites mixed with the ore before reduction, 90 to 95 per cent of the cobalt and nickel was extractable.

An oxidized Cuban iron ore containing 1.5 per cent of nickel, 3 per cent of chromium, about 5 per cent of aluminum, 47 per cent of iron, 12 per cent of combined water, and 0.1 per cent of sulfur, when reduced with coal or oil alone, rendered quasi-wet and chloridized as in the preceding example, gave extractions of 50 to 60 per cent. The extractions were increased directly to 90 to 95 per cent, however, by treating the same ore in accordance with the practice of this invention, using 1 per cent of elemental sulfur.

In both of the foregoing examples leaching with dilute hydrochloric acid extracted about 50 to 60 per cent of the metal recovery when no sulfur material was used. But using sulfur in accordance with the invention as much as 80 per cent of the metal values could be recovered with dilute hydrochloric acid, the remainder of the recovery, i. e., the last 15 to 20 per cent, being solubilized after chloridizing by the method of my Patent No. 1,822,995.

This Cuban ore when treated by the foregoing method and leached with iron chloride solution made slightly acid with HCl gave an extraction of 87 per cent of the nickel content.

As stated hereinabove, concentrates of the metal value sulfides may be prepared easily by subjecting the treated ore to flotation methods, and this is a particularly valuable aspect of the invention, as will be recognized by those skilled in the art.

The practice of the invention thus provides for high recoveries of metal values, due, as I now believe, to their conversion to loosely bound compounds with sulfur. Whatever be the true nature of the products formed in the treatment, they are directly extractable by liquid reagents. In some instances minor proportions of the values may also form sulfur compounds not directly extractable by liquid reagents. The residual content of these values may be recovered by an appropriate chloridizing treatment, most suitably by rendering the tailings quasi-wet with a chloride solution, such as iron chloride solution, and aerating to cause chloridizing of the values. Or, the quasi-wet mass, moistened with water or a reagent solution, may be treated with chlorine gases, e. g., chlorine, hydrochloric acid gas, etc., followed by heating, if need be, to decompose iron chloride for chloridizing exceptionally refractory compounds.

Where chloridizing is desirable for any reason, e. g., to increase the yields, as mentioned, hereinabove, it may be applied directly to the treated ore, the treatment of this invention furthering such chloridizing. The following examples are illustrative both of the use of sulfide ores containing metal values (as solid sulfur material), and also of such chloridizing.

A Cuban iron ore containing 1.6 per cent of nickel was mixed with 3 per cent of iron pyrite containing 47 per cent of sulfur and was reduced with 5 per cent of coal by heating to 630° C. and soaking for 3 hours. After cooling in a non-oxidizing atmosphere it was made quasi-wet with 10 per cent of ferrous chloride solution (to provide about 0.5 per cent more chlorine than needed to chloridize the nickel), after which the ore was aerated 4 hours. It was then aged 3 days in a closed vat. Analysis showed 1.41 per cent of water soluble nickel, while the soluble iron was but 0.23 per cent. Another portion was treated with iron chloride solution made very slightly acid with HCl, and agitated 20 hours in air, when 1.44 per cent of the nickel was found to be soluble.

In another test the same Cuban ore was mixed with 10 per cent of finely ground iron pyrite containing 1.7 per cent of copper, 1.5 per cent of cobalt, 52 per cent of iron, and about 39 per cent of sulfur. The mixture was heated in an oxidizing atmosphere, then reduced with 5 per cent of coal, soaked 3 hours at about 625° C., and cooled to normal temperature out of contact with air. The reduced material was treated with 10 per cent of a ferrous chloride solution and aged 4 days in a closed container. Upon leaching with water it was found that more than 89 per cent of the nickel was removed, and the cobalt and copper present were 77 and 88 per cent soluble, respectively, showing the applicability of the invention to free metal values in complexes in the solid sulfur material.

Still another portion of the same Cuban ore was heated and then reduced with 5 per cent of coal and 5 per cent of a pyrite containing 1.83 per cent of copper. It was then chloridized by moistening with ferrous chloride solution followed by aging 4½ days in a closed container. Leaching removed about 86.5 per cent of the nickel content, and 84 per cent of the copper, in water soluble forms. Another portion was treated with iron chloride solution and agitated 24 hours in air; this rendered 83.5 per cent of the nickel and 87 per cent of the copper soluble.

The foregoing tests were repeated using water to render the ore quasi-wet, and contacting the quasi-wet ore with chlorine, to form iron chloride, which was then decomposed to effect chloridizing as in the preceding examples, with somewhat better results. By aerating the material the time of aging may be shortened somewhat and the excess iron chloride will be more completely insolubilized.

This application is a continuation-in-part of my copending application Serial No. 678,057, filed June 28, 1933.

According to the provisions of the Patent Statutes, I have explained the principle of my invention and have described what I now consider to represent its best embodiment. However, I desire to have it understood that, within the scope of the appended claims, the invention may be practiced otherwise than as specifically described.

I claim:

1. In a process of treating an oxidized ore substantially free from sulfur to recover metal values therefrom, the steps comprising partially reducing the ore at a temperature of about 350° to 800° C. in a reducing atmosphere in admixture with a solid sulfur material and thereby converting metal values to form readily amenable to separation, cooling in a non-oxidizing atmosphere, and treating the ore to recover metal values therefrom.

2. In a process of treating an oxidized ore substantially free from sulfur to recover metal values therefrom, the steps comprising partially reducing the ore with a combustible reducing agent at a temperature of about 350° to 800° C. in a reducing atmosphere in admixture with a solid sulfur material to convert metal values to readily separable form, cooling the ore under non-oxidizing conditions, and treating the ore to recover metal values therefrom.

3. A process according to claim 2, said reducing agent being coal.

4. In a process of treating an oxidized ore substantially free from sulfur to recover metal values therefrom, the steps comprising heating the ore to a temperature of about 600° to 800° C., and while thus heated soaking it under heat-retaining conditions in a non-oxidizing atmosphere in admixture with a combustible reducing agent and a solid sulfur material, to thereby partially reduce the ore and convert metal values to readily separable form, cooling the ore in a non-oxidizing atmosphere, and treating the ore to recover metal values therefrom.

5. A process according to claim 4 in which a small amount of reducing gas is passed through the ore during said soaking.

6. In a process of treating an oxidized ore substantially free from sulfur to recover metal values therefrom, the steps comprising subjecting the ore to partial reduction at a temperature of about 350° to 800° C. and in a non-oxidizing atmosphere in admixture with sulfide ore and thereby converting metal values of both the sulfide and the non-sulfide ore to readily separable form, cooling the ore in a non-oxidizing atmosphere, and treating the ore to recover metal values therefrom.

7. In a process of treating an oxidized ore substantially free from sulfur to recover metal values therefrom, the steps comprising heating the ore to a temperature of about 600° to 800° C., soaking the heated ore under heat-retaining conditions in a non-oxidizing atmosphere in admixture with a combustible reducing agent and a sulfide ore to partially reduce the ore and convert metal values of both the sulfide and the non-sulfide ore to readily separable form, cooling in a non-oxidizing atmosphere, and treating to recover metal values therefrom.

8. A process according to claim 7, said reducing agent being coal.

9. In a process of treating an oxidized ore substantially free from sulfur to recover metal values therefrom, the steps comprising partially reducing the ore in admixture with a solid sulfur material in a reducing atmosphere at a temperature of about 350° to 800° C., thereby converting metal values to readily separable form, cooling under non-oxidizing conditions, and treating the ore with a liquid solvent to recover metal values therefrom.

10. A process according to claim 9, said solvent comprising a chloride solution.

11. In a process of treating an oxidized ore substantially free from sulfur to recover metal values therefrom, the steps comprising partially reducing the ore with a combustible reducing agent at a temperature of about 350° to 800° C., in a reducing atmosphere and in admixture with a sulfide ore, thereby converting metal values of both the sulfide and the non-sulfide ore to readily separable form, cooling in a non-oxidizing atmosphere, and treating the ore with a liquid solvent to recover metal values therefrom.

12. In a process of treating an oxidized ore substantially free from sulfur to recover metal values therefrom, the steps comprising heating the ore at a temperature of about 600° to 800° C. and soaking it under heat-retaining conditions in a reducing atmosphere in admixture with coal and sufide ore materal, thereby partially reducing the ore and converting metal values of both of said ores to readily separable form, cooling in a non-oxidizing atmosphere and treating the ore with a liquid solvent to recover metal values therefrom.

13. A process according to claim 9, said reducing agent being coal.

14. In a process of treating an oxidized ore substantially free from sulfur to recover metal values therefrom, the steps comprising partially reducing the ore at a temperature of about 350° to 800° C. in a non-oxidizing atmosphere in admixture with a solid sulfur material, thereby converting metal values to readily separable form, cooling the ore in a non-oxidizing atmosphere, and subjecting the ore to flotation to recover concentrate of metal values therefrom.

15. In a process of treating an oxidized ore substantially free from sulfur to recover metal values therefrom, the steps comprising partially reducing the ore with a combustible reducing agent at a temperature of about 350° to 800° C. in a non-oxidizing atmosphere in admixture with sulfide ore, thereby converting metal values of both of said ores to readily separable form, cooling in a non-oxidizing atmosphere, and subjecting the ore to flotation to recover concentrate of metal values therefrom.

16. In a process of treating an oxidized ore substantially free from sulfur to recover metal values therefrom, the steps comprising heating the ore to about 600° to 800° C. and soaking the hot mixture under heat-retaining conditions and mixed with coal and a solid sulfur material to effect partial reduction of the ore, break down refractory compounds, and convert metal values to readily separable form, and subjecting the ore to flotation to recover concentrate of metal values therefrom.

17. A process according to claim 16, said solid sulfur material comprising sulfide ore and the process rendering metal values of both the sulfide and oxidized ores readily recoverable.

18. In a process of treating an oxidized ore substantially free from sulfur to recover metal values therefrom, the steps comprising partially reducing the ore at a temperature of 350° to 800° C. with a combustible reducing agent in a reducing atmosphere and in admixture with a solid sulfur material to convert metal values to readily recoverable form, cooling the ore under non-oxidizing conditions, chloridizing the metal values, and leaching to remove said chlorides.

19. In a process of treating an oxidized ore substantially free from sulfur to recover metal values therefrom, the steps comprising partially reducing the ore with a combustible reducing agent at a temperature of 350° to 800° C. in a non-oxidizing atmosphere and in admixture with a solid sulfur material and thereby converting metal values to readily separable form, cooling the ore in a non-oxidizing atmosphere, rendering the ore quasi-wet and contacting it with a chloridizing reagent of the group chlorine gases and iron chloride, aging the quasi-wet material, and leaching to remove metal value chlorides.

RALPH F. MEYER.